United States Patent
Daido et al.

(10) Patent No.: US 9,884,599 B2
(45) Date of Patent: Feb. 6, 2018

(54) VEHICLE FRONT STRUCTURE

(71) Applicant: HONDA MOTOR CO., LTD., Tokyo (JP)

(72) Inventors: Kazuhiro Daido, Utsunomiya (JP); Junya Harada, Utsunomiya (JP); Keita Ishihara, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/344,620

(22) Filed: Nov. 7, 2016

(65) Prior Publication Data

US 2017/0129432 A1 May 11, 2017

(30) Foreign Application Priority Data

Nov. 9, 2015 (JP) .................................. 2015-219504

(51) Int. Cl.
| | |
|---|---|
| *B60R 19/34* | (2006.01) |
| *B62D 21/15* | (2006.01) |
| *B62D 25/08* | (2006.01) |
| *B60R 19/02* | (2006.01) |

(52) U.S. Cl.
CPC ............ *B60R 19/34* (2013.01); *B60R 19/023* (2013.01); *B62D 21/152* (2013.01); *B62D 25/08* (2013.01)

(58) Field of Classification Search
CPC .................................................. B60R 19/34
USPC ................................. 296/133, 187.09, 187.1
See application file for complete search history.

(56) References Cited

U.S. PATENT DOCUMENTS

| 9,180,828 B2 * | 11/2015 | Sakakibara ............. B60R 19/34 |
| 9,669,875 B2 * | 6/2017 | Kramer ................. B62D 21/152 |
| 2002/0079711 A1 * | 6/2002 | Kajiwara ................ B60R 19/18 |
| | | 293/133 |
| 2015/0298634 A1 * | 10/2015 | Hara ....................... B60R 19/34 |
| | | 293/133 |

FOREIGN PATENT DOCUMENTS

| JP | 2004-237902 A | 8/2004 |
| JP | A-2006-231965 | 9/2006 |
| JP | A-2007-237872 | 9/2007 |
| JP | A-2008-074349 | 4/2008 |

(Continued)

OTHER PUBLICATIONS

JP Office Action dated Aug. 29, 2017 from corresponding Japanese patent application No. 2015-219504 (with attached English-language translation).

*Primary Examiner* — Dennis H Pedder (74) *Attorney, Agent, or Firm* — Drinker Biddle & Reath LLP (57) ABSTRACT

A vehicle front structure includes a front frame member, a bumper beam (9) disposed at a front section of the vehicle in a vehicle width direction, a crush box (10) fixed to a rear surface of the bumper beam (9) and having a rear end portion coupled to a front end portion of the front frame member, and a corner reinforcement member (15) disposed at a corner portion formed between the rear surface of the bumper beam (9) and the side surface of the crush box (10), wherein an outer surface of the corner reinforcement member (15) is joined in a state in which the outer surface abuts the rear surface of the bumper beam (9) and the side surface of the crush box (10).

8 Claims, 10 Drawing Sheets

(56) References Cited

FOREIGN PATENT DOCUMENTS

| JP | A-2010-260499 | | 11/2010 |
|----|---------------|----|---------|
| JP | 5063753 | B2 | 10/2012 |
| WO | WO 2014/173476 | A1 | 10/2014 |

* cited by examiner

VEHICLE FRONT STRUCTURE

CROSS-REFERENCE TO RELATED APPLICATION

Priority is claimed on Japanese Patent Application No. 2015-219504, filed on Nov. 9, 2015, the contents of which are incorporated herein by reference.

BACKGROUND OF THE INVENTION

Field of the Invention

The present invention relates to a vehicle front structure including a bumper beam configured to receive a load from a forward side of a vehicle.

Description of Related Art

A bumper configured to receive a load from a forward side is attached to a front section of a vehicle.

The bumper has a bumper beam disposed inside a bumper face serving as a skin, and the bumper beam is supported by a front side-frame or the like serving as a front frame member of the vehicle.

As a vehicle front structure, a structure in which a crush box configured to absorb energy of an input load through a crush is interposed between a bumper beam and a front side-frame is known (for example, see Japanese Patent No. 5063753 and Japanese Unexamined Patent Application, First Publication No. 2004-237902).

SUMMARY OF THE INVENTION

The above-mentioned vehicle front structure of the related art absorbs energy of an input load when the crush box crushes upon input of an impact load from a forward side of the vehicle. For this reason, the crush box should crush before the front frame member of the vehicle such as a front side-frame or the like is deformed, and should have deformation strength smaller than that of the front frame member.

In addition, in the above-mentioned vehicle front structure of the related art, when a load input into the bumper beam is small, the bumper beam itself is deformed to absorb energy of the input load.

For this reason, while the deformation strength of the bumper beam should be set to a somewhat small value, the deformation strength should be within a range in which functional parts such as a radiator or the like in the front of the vehicle body can be protected from input of a small load. Then, even in the crush box configured to support the bumper beam, the deformation strength should also be within a range in which functional parts of the front section of the vehicle body can be similarly protected.

However, in practice, it is difficult to set deformation strength appropriate for various types of load inputs using only materials or shapes of the bumper beam and the crush box attached to the front frame member.

An aspect of the present invention is directed to provide a vehicle front structure capable of obtaining deformation behaviors of parts appropriate for types of load inputs.

In order to solve the problems, an aspect of the present invention has employed the following configurations.

(1) A vehicle front structure according to an aspect of the present invention includes a front frame member of a vehicle; a bumper beam disposed at a front section of the vehicle in a vehicle width direction; a crush box fixed to a rear surface of the bumper beam and having a rear end portion coupled to a front end portion of the front frame member; and a corner reinforcement member disposed at a corner portion formed between the rear surface of the bumper beam and a side surface of the crush box, wherein an outer surface of the corner reinforcement member is joined in a state in which the outer surface abuts the rear surface of the bumper beam and the side surface of the crush box.

According to the configuration of (1), when a load is input from a forward side of the bumper beam, the load is directly supported by a front end surface of the crush box through the rear surface of the bumper beam and the load is also supported by the side surface of the crush box via the corner reinforcement member. For this reason, when the input load into the bumper beam is small, the load can be mainly absorbed by deformation of the bumper beam without the crush of the crush box. Here, since the crush box does not crush, functional parts such as a radiator or the like disposed at the front section of the vehicle body can be easily protected. In addition, since the load is input from the front surface and the side surface into the crush box, energy of the input load can be efficiently absorbed by deformation of the crush box in a wide range.

In addition, when the load input into the bumper beam is large, the load is directly input into the front surface of the crush box from the bumper beam together with the deformation of the bumper beam, and the load is input into the side surface of the crush box from the corner reinforcement member to press the side surface thereof. For this reason, the crush box easily can crush in the forward and rearward direction of the vehicle due to the pressing of the side surface of the corner reinforcement member. As a result, energy of the load input into the bumper beam can be efficiently absorbed by the crush of the crush box. In addition, as described above, since the crush box starts to crush due to the pressing of the side surface by the corner reinforcement member, a peak of a load resistance immediately before the crush of the crush box can be suppressed to a low level.

(2) In the aspect of (1), the corner reinforcement member may be a member in which a horizontal cross section of the outer surface has a polygonal shape, and may have at least an inclined wall extending to diagonally connect the rear surface of the bumper beam and the side surface of the crush box.

In this case, since the corner reinforcement member is a polygonal member having an inclined wall, the corner reinforcement member can be easily manufactured, and further, timing or the like of the crush of the crush box can be easily set and adjusted by changing a thickness of the inclined wall.

(3) In the aspect of (2), the corner reinforcement member may have a substantially triangular hollow cross section formed by a first sidewall joined to the rear surface of the bumper beam, a second sidewall joined to the side surface of the crush box, and the inclined wall configured to diagonally couple the first sidewall and the second sidewall, the first sidewall and the second sidewall may be connected by an arc-shaped wall having a substantially arc-shaped cross section, and extension flanges may be arranged at end portions of the first sidewall and the second sidewall that are opposite to the arc-shaped wall, the extension flanges may be joined to the rear surface of the bumper beam and the side surface of the crush box.

In this case, since the first sidewall joined to the rear surface of the bumper beam and the second sidewall joined to the side surface of the crush box are connected by the arc-shaped wall having a substantially arc-shaped cross section, even when a protrusion such as a weld bead or the like is provided at the corner portion between the rear surface of the bumper beam and the side surface of the crush box, the corner reinforcement member can be easily joined to a back surface of the bumper beam and the side surface of the crush box. In addition, stress concentration of a connecting portion of the first sidewall and the second sidewall can be reduced by the arc-shaped wall having a substantially arc-shaped cross section. In addition, since the extension flanges extend from the first sidewall and the second sidewall, the corner reinforcement member can be easily joined to the bumper beam or the crush box using the extension flange and a joining area of the corner reinforcement member with respect to the bumper beam or the crush box can be increased.

Further, the corner reinforcement member can be easily manufactured through the metal extrusion.

(4) In the aspect of any one of (1) to (3), the bumper beam may have a plurality of hollow sections having cross sections in forward, rearward, upward and downward directions of a vehicle body, which are partitioned by lateral walls, and the crush box may have a plurality of hollow sections having cross sections in the vehicle width direction and the upward and downward directions, which are partitioned by longitudinal walls.

In this case, the load input into the bumper beam from the forward side is transmitted to the crush box through the lateral walls that form the plurality of hollow sections of the bumper beam. The load input into the crush box is input into the front frame member of the vehicle through the longitudinal walls that form the plurality of hollow sections of the crush box. Accordingly, the load input into the bumper beam from the forward side can be efficiently transmitted to the crush box or the front frame member of the vehicle.

(5) In the aspect of any one of (1) to (4), the bumper beam may have an opening formed at an end portion in the vehicle width direction, the opening may be closed by a lid member, the lid member may have an extension section extending toward an inside of the crush box, and the extension section may be coupled to the front frame member together with the crush box.

In this case, when a large offset load is input into one end side of the bumper beam in the vehicle width direction, the load is input into the crush box of the one end side and the crush box crushes, and the forward displacement of the other end side of the bumper beam is restricted by the front frame member of the vehicle through the extension section of the lid member of the other end side. Accordingly, the load can also be easily input into the crush box at the other end side, and the energy of the input load can be efficiently absorbed within a wide range in the vehicle width direction.

(6) In the aspect of (5), a deformation allowable portion having a wave pattern shape may be formed at the extension section of the lid member.

In this case, when the large load is input into the bumper beam from the forward side and the crush box is crushing in the forward and rearward directions of the vehicle body, the extension sections of the lid member can be easily deformed at the deformation allowable portion having a wave pattern shape. Accordingly, since the extension sections of the lid member do not interfere with the crush of the crush box, it is possible to make the crush box to easily crush within a load range as designed.

(7) In the aspect of any one of (1) to (6), the front frame member may have a front side-frame extending forward from a front section of a vehicle compartment, and an auxiliary side-frame extending from a front pillar of the vehicle body toward a forward side of the vehicle body and having a front end portion disposed outside of the front side-frame in the vehicle width direction, a fragile portion may be formed at a position spaced apart from the front end portion of the side surface of the front side-frame, the crush box may be coupled and bridged to the front end portion of the front side-frame and the front end portion of the auxiliary side-frame, a reinforcement block having a substantially triangular shape when seen from above is joined to the front end portion of the auxiliary side-frame, the rear surface of the bumper beam and the side surface of the front side-frame, and the reinforcement block may have a load transmission wall diagonally extending from the front end portion of the auxiliary side-frame toward a vicinity of the fragile portion of the front side-frame.

In this case, when a large offset load is input into one end side of the bumper beam in the vehicle width direction, the load is transmitted to the front side-frame and the auxiliary side-frame via the crush box of the one end side in the vehicle width direction. At this time, the load is also transmitted from the crush box to the reinforcement block having a substantially triangular shape when seen from above, the load is applied to the vicinity of the fragile portion of the front side-frame through the load transmission wall of the reinforcement block. For this reason, when the load input advances through the bumper beam, the front side-frame can be easily folded about the fragile portion after the crush box has crushed in the forward and rearward directions of the vehicle body. Accordingly, energy of the input load can be efficiently absorbed by the deformations of the front side-frame and the auxiliary side-frame.

According to the aspect of the present invention, since the corner reinforcement member is disposed at the corner portion between the rear surface of the bumper beam and the side surface of the crush box, and the outer surface of the corner reinforcement member is joined in a state in which the outer surface abuts the rear surface of the bumper beam and the side surface of the crush box, when the load input into the bumper beam is small, it is possible to make the bumper beam to deform in preference to absorb the energy of the input load, and when the load input into the bumper beam is large, it is possible to efficiently absorb the energy of the input load by the crush of the crush box due to the pressing of the side surface by the corner reinforcement member. Accordingly, according to the aspect of the present invention, deformation behaviors of the parts which are appropriate for various types of load input can be obtained, and energy of the input load can be appropriately absorbed with respect to any type of load input.

DETAILED DESCRIPTION OF THE INVENTION

Hereinafter, an embodiment of the present invention will be described based on the accompanying drawings. Further, in the drawings, an arrow FR shows a forward direction of a vehicle, an arrow UP shows an upward direction of the vehicle, and an arrow LH shows a leftward direction of the vehicle.

Figure 1:
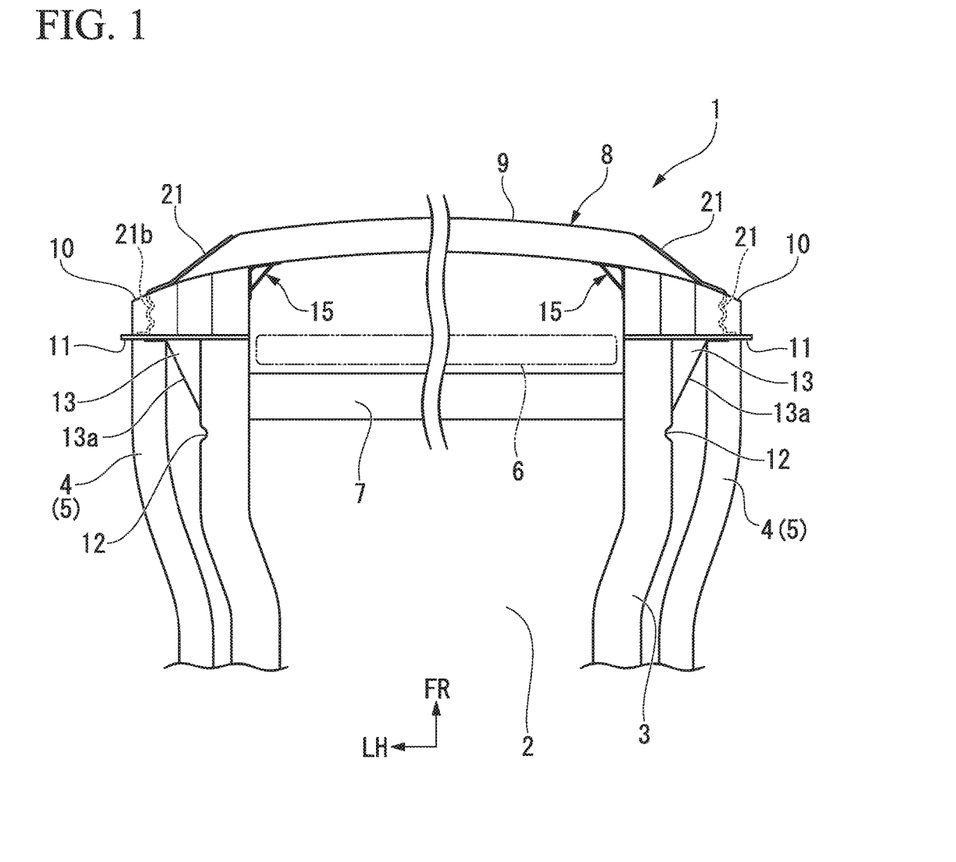
FIG. 1 is a schematic plan view of a front side-frame section of a vehicle according to an embodiment of the present invention.

FIG. 1 is a view schematically showing a frame section of a front side of a vehicle 1 according to the embodiment.

Reference numeral 2 of FIG. 1 is an engine room disposed in front of a vehicle compartment. Front side-frames 3 extending forward from a lower side of a front section of the vehicle compartment are disposed at both sides in a vehicle width direction of the engine room 2. Rear sections of the left and right front side-frames 3 are connected to side seals serving as left and right strength members of the vehicle via extensions (not shown).

In addition, upper members (not shown) extending toward a forward side of a vehicle body extend from center pillars (not shown) of left and right sides of the vehicle body. Lower members 4 having front end portions disposed outside in a vehicle width direction of the corresponding left and right front side-frames 3 are integrally coupled to front sections of the left and right upper members. In the embodiment, the upper members (not shown) and the lower members 4 constitute auxiliary side-frames 5. The auxiliary side-frames 5 transmit a load input from a forward side of the vehicle body to a rearward side of the vehicle body together with the front side-frames 3 at outside in the vehicle width direction of the left and right front side-frames 3.

Further, front edge portions of the left and right front side-frames 3 are connected to each other by a cross member 7 that functions as a support portion of a lower side of a radiator 6 serving as a functional part. In addition, in the embodiment, the front side-frames 3 and the auxiliary side-frames 5 constitute a front frame member of the vehicle.

A bumper unit 8 is attached to the front end portions of the left and right front side-frames 3 and the auxiliary side-frames 5.

Figure 2:
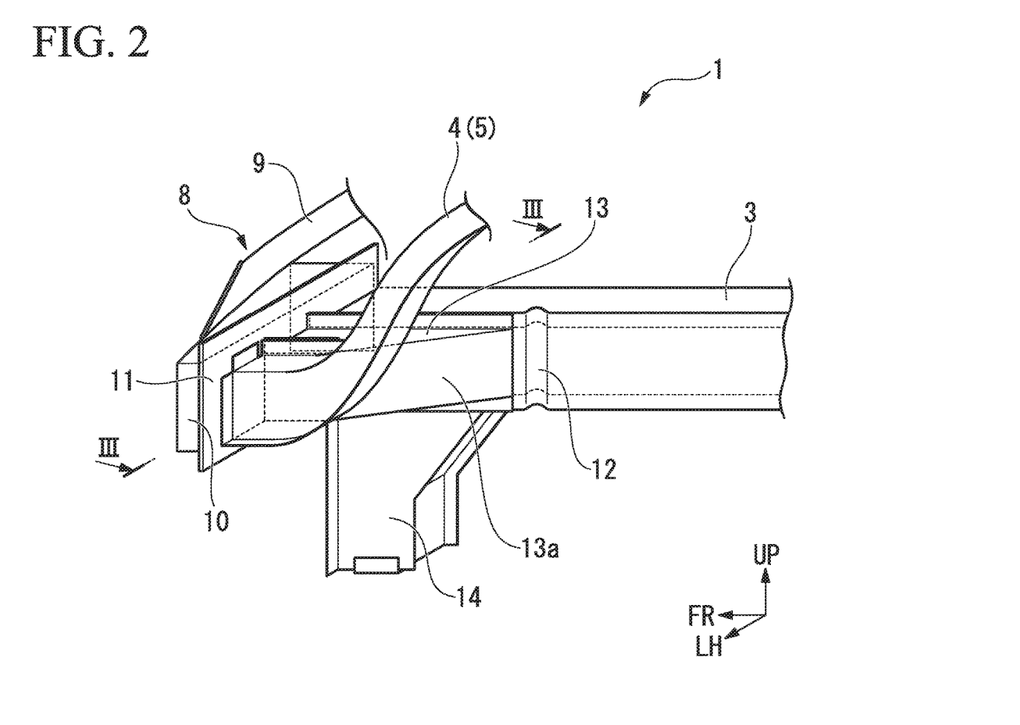
FIG. 2 is a perspective view of the front side-frame section of the vehicle according to the embodiment of the present invention.
Figure 3:
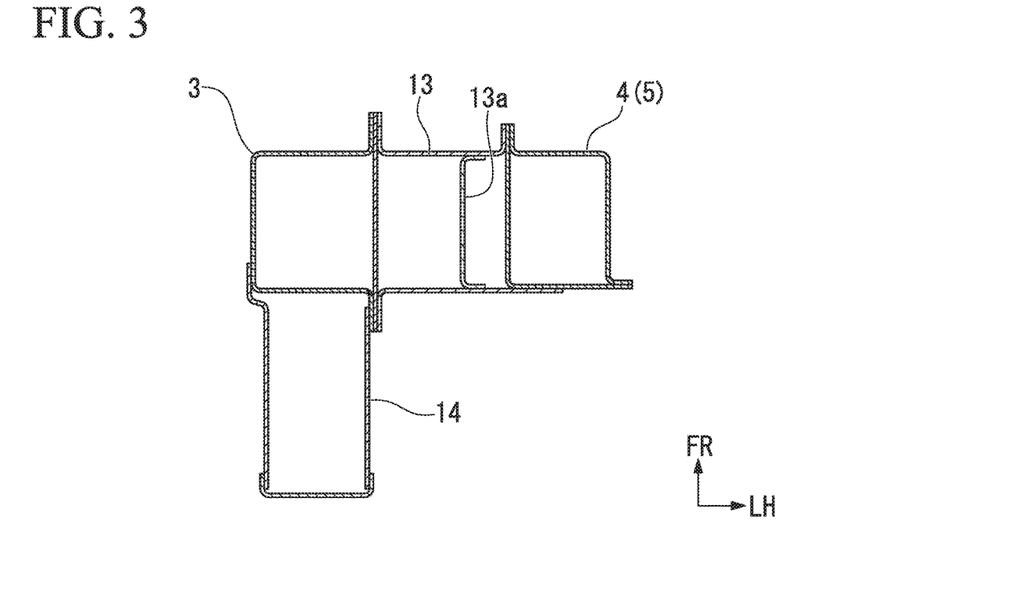
FIG. 3 is a cross-sectional view taken along line V-V of FIG. 2 of the vehicle according to the embodiment of the present invention.
Figure 4:
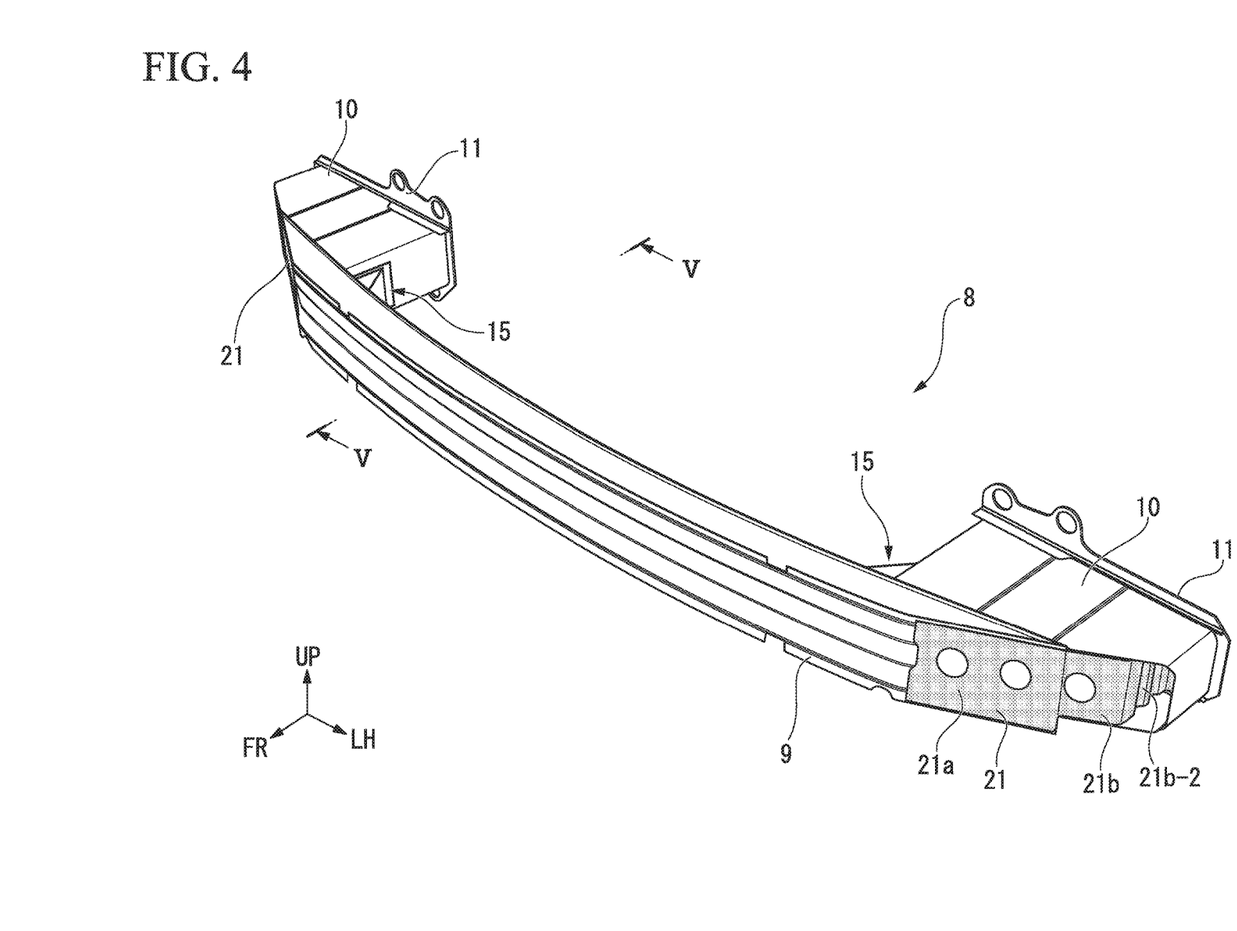
FIG. 4 is a perspective view of a bumper unit of a front side of the vehicle according to the embodiment of the present invention.
Figure 5:
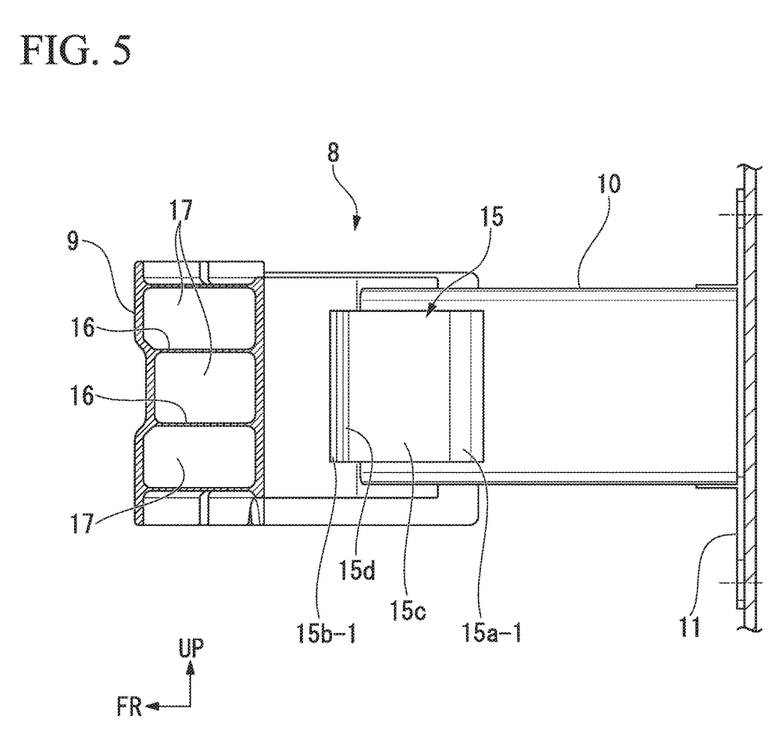
FIG. 5 is a cross-sectional view taken along line V-V of FIG. 4 of the bumper unit according to the embodiment of the present invention.

FIG. 2 is a view showing a frame section of a left front section of the vehicle 1 when seen from an upper side of a left rear section, and FIG. 3 is view a showing a cross section taken along line III-III of FIG. 2. In addition, FIG. 4 is a view showing the bumper unit 8 when seen from an upper side of a left front section of the vehicle, and FIG. 5 is a view showing a cross section taken along line V-V of FIG. 4.

As also shown in these drawings, the bumper unit 8 includes a bumper beam 9 extending in a vehicle width direction, and a pair of crush boxes 10 integrally attached to rear surface sides of left and right end portions of the bumper beam 9. The crush boxes 10 absorb energy of an input load as the crush boxes 10 crush in forward and rearward directions of the vehicle body when a predetermined load or more is input. A connecting plate 11 is coupled to rear surfaces of the left and right crush boxes 10, and the connecting plate 11 is coupled to the front end portions of the auxiliary side-frames 5 of the front side-frames 3.

As shown in FIGS. 1 and 2, fragile portions 12 recessed inward in the vehicle width direction are disposed at positions spaced predetermined distances from the front end portions in outer side surfaces of the left and right front side-frames 3. In addition, reinforcement blocks 13 having substantially triangular shapes when seen from above are joined to portions of the front end portions of the auxiliary side-frames 5, the connecting plates 11 (a rear surface of the bumper beam 9), and outer side surfaces of the front side-frames 3. The reinforcement blocks 13 are hollow metal blocks and have load transmission walls 13a diagonally extending to be inclined from portions inside in the vehicle width direction of the front end portions of the auxiliary side-frames 5 toward the vicinity of the fragile portions 12 of the outer side surfaces of the front side-frames 3. Further, reference numeral 14 of FIGS. 2 and 3 is a sub-frame support column coupled to a lower surface of the front edge portion of each of the front side-frames 3 to support a sub-frame (not shown).

Figure 6:
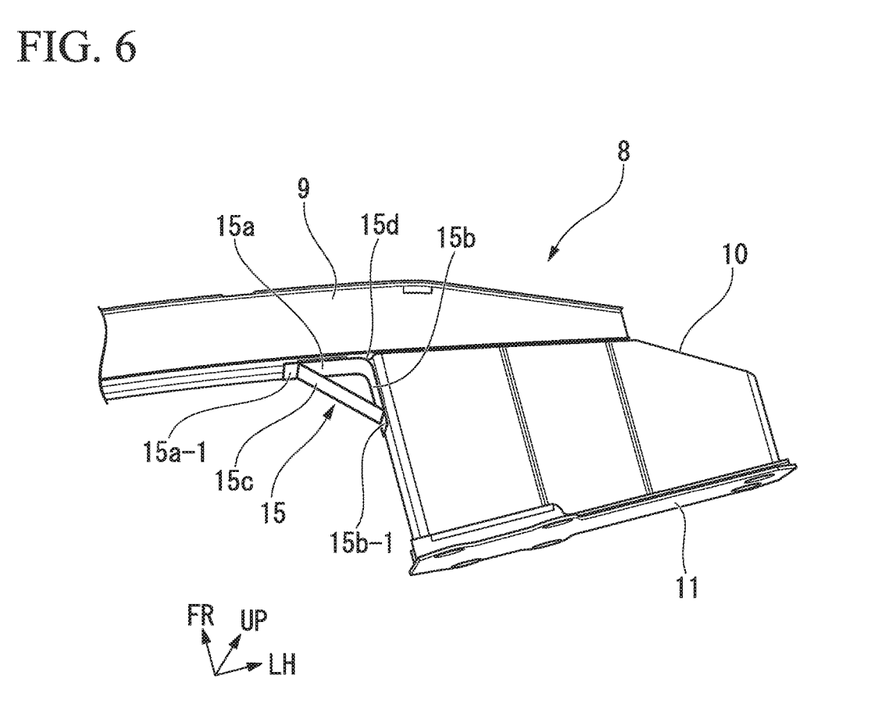
FIG. 6 is a perspective view of the bumper unit according to the embodiment of the present invention.
Figure 7:
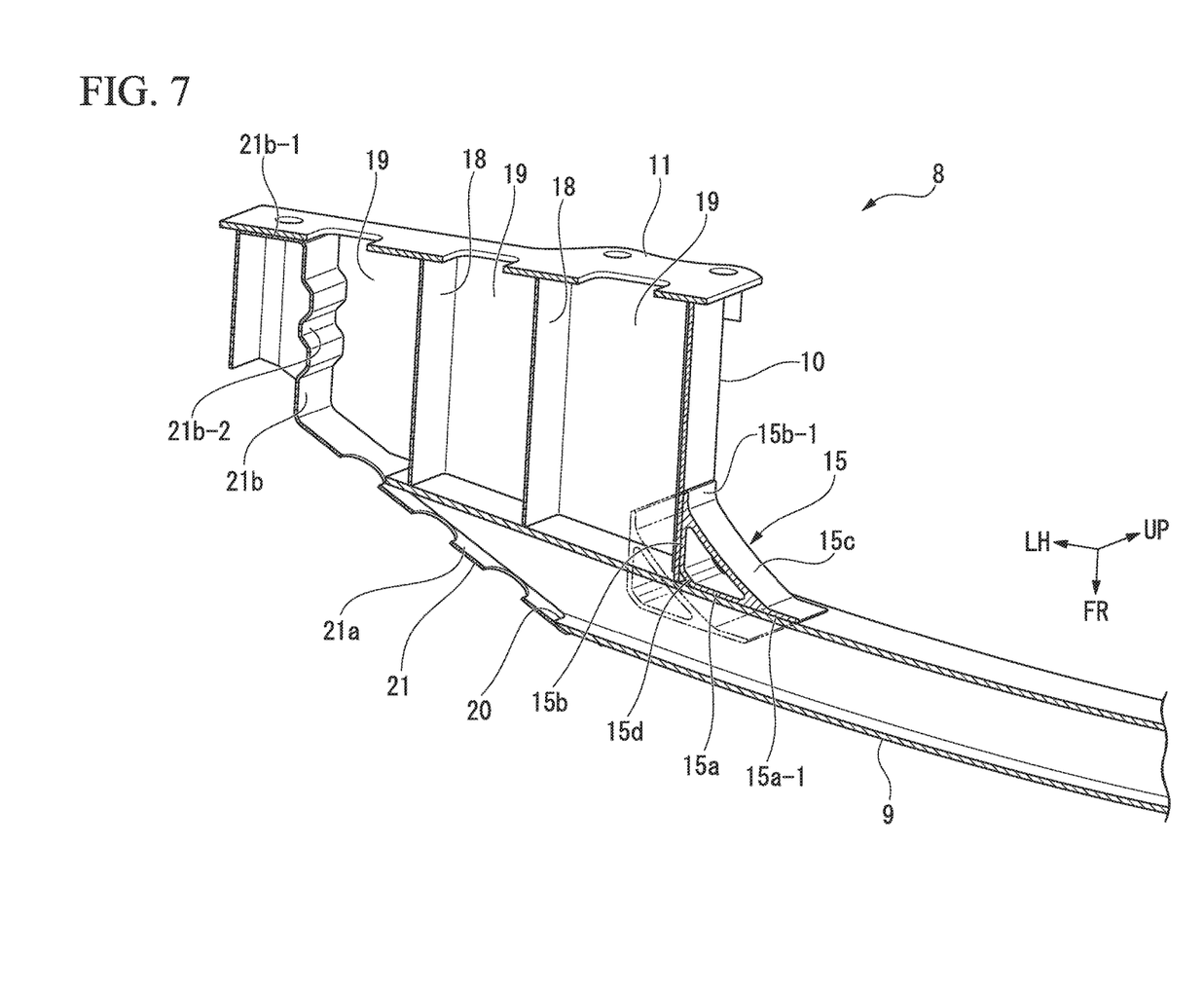
FIG. 7 is a perspective view of the bumper unit with part broken according to the embodiment of the present invention.
Figure 8:
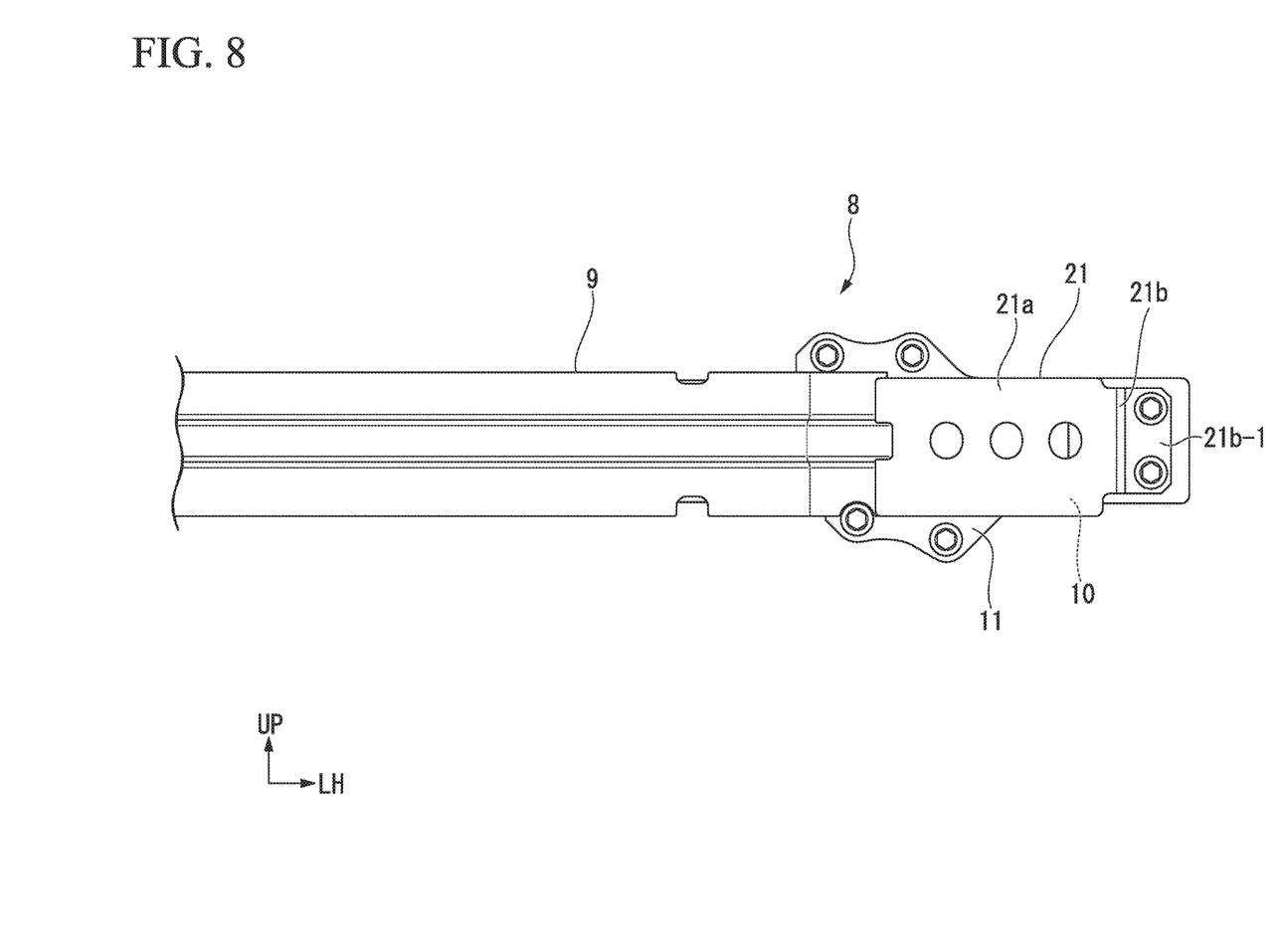
FIG. 8 is a front view of the bumper unit according to the embodiment of the present invention.

FIG. 6 is a perspective view showing a left portion of the bumper unit 8 from below, and FIG. 7 is a perspective view showing the left portion of the bumper unit 8 through a cross section in a horizontal direction from below. In addition, FIG. 8 is a view showing the left portion of the bumper unit 8 from a forward side.

Both edge portions in the vehicle width direction of the bumper beam 9 are slightly curved rearward along a front surface shape of the vehicle body, and front end portions of the crush boxes 10 are coupled to rear surfaces of both of the edge portions. The rear surface of the bumper beam 9 and the side surfaces inside in the vehicle width direction of the crush boxes 10 are formed at substantially a right angle. Corner reinforcement members 15 having outer surfaces with horizontal cross sections of substantially right-triangular shapes are disposed at corner portions between the rear surface of the bumper beam 9 and the side surfaces of the crush boxes 10.

The corner reinforcement members 15 come in surface contact with the rear surface of the bumper beam 9 and the side surfaces of the crush boxes 10 to be joined thereto through welding or the like. That is, the corner reinforcement members 15 are joined by welding or the like in a state in which the outer surfaces thereof abut the rear surface of the bumper beam 9 and the side surfaces of the crush boxes 10.

The corner reinforcement members 15 are formed by metal extrusion such as aluminum extrusion or the like. As shown in FIGS. 5 to 7, each of the corner reinforcement members 15 has a first sidewall 15a joined to the rear surface of the bumper beam 9, a second sidewall 15b joined to the inner side surface of one of the crush boxes 10, and an inclined wall 15c diagonally inclined with respect to the first sidewall 15a and the second sidewall 15b and connecting them, and thus a substantially right-triangular hollow cross section is formed thereby. The inclined wall 15c is diagonally inclined and disposed to connect the rear surface of the bumper beam 9 and the side surface of the crush box 10 in a state in which the corner reinforcement member 15 is attached to the bumper beam 9 and the crush box 10.

The first sidewall 15a and the second sidewall 15b of the corner reinforcement member 15 are connected by an arc-shaped wall 15d having an arc-shaped cross section. Then, an extension flange 15a-1 extending farther outward than a connecting portion to the inclined wall 15c extends from an end portion of the first sidewall 15a opposite to the arc-shaped wall 15d. Similarly, an extension flange 15b-1 extending farther outward than the connecting portion to the inclined wall 15c extends from an end portion of the second sidewall 15b opposite to the arc-shaped wall 15d.

As shown in FIG. 5, the bumper beam 9 has a plurality of (in the example of the embodiment, two) lateral walls 16 extending substantially horizontally in the vehicle width direction and vertically spaced apart from each other inside an outer wall thereof. A cross section in forward, rearward, upward and downward directions of the vehicle body of the bumper beam 9 has a plurality of hollow sections 17 partitioned by the lateral walls 16.

As shown in FIG. 7, the crush box 10 has a plurality of (in the example of the embodiment, two) longitudinal walls 18 extending in the forward and rearward directions of the vehicle body and separated at left and right sides inside in the outer wall. A cross section in the vehicle width direction and the upward and downward directions of the crush box 10 has a plurality of hollow sections 19 therein partitioned by the longitudinal walls 18.

In addition, as shown in FIG. 7, both end portions in the vehicle width direction of the bumper beam 9 are diagonally inclined toward a rear side portion, and an opening 20 is formed in the diagonally inclined portion. The opening 20 is closed by a lid member 21 formed of a sheet metal. As shown in FIGS. 4, 7 and 8, the lid member 21 has a lid main body section 21a having a large vertical width and configured to close the opening 20, and an extension section 21b extending from an end portion outside in a vehicle width direction of the lid main body section 21a toward the inside of the hollow section 19 of the crush box 10 and having a width smaller than that of the lid main body section 21a.

The lid main body section 21a is joined to both end portions of the bumper beam 9 by an appropriate means such as welding or the like. In addition, a joining flange 21b-1 curved outward in the vehicle width direction is formed at a front end side of the extension section 21b. The extension section 21b is inserted into the hollow section 19 of the crush boxes 10, and the joining flange 21b-1 overlaps an upper surface of the connecting plate 11 at a rear side of the crush box 10. The joining flange 21b-1 of the extension section 21b is coupled to a front end portion of the auxiliary side-frame 5 serving as the front frame member of the vehicle together with the connecting plate 11 by bolts. In addition, as shown in FIGS. 4 and 7, a deformation allowable portion 21b-2 curved in a wave pattern shape substantially in the forward and rearward directions of the vehicle body is installed at the extension section 21b.

The deformation allowable portion 21b-2 suppresses generation of a repulsive force by deformation in a bellows shape when a compressive load in the forward and rearward directions of the vehicle body is applied to the extension section 21b.

Next, behaviors of parts of the front section of the vehicle when the load is input from the forward side of the bumper beam 9 will be described.

When the load is input from the forward side of the bumper beam 9, the load is directly supported by the front end surface of the crush box 10 through the rear surface of the bumper beam 9, and also supported by the inner side surface of the crush box 10 via the corner reinforcement member 15 having high stiffness.

Figure 9:
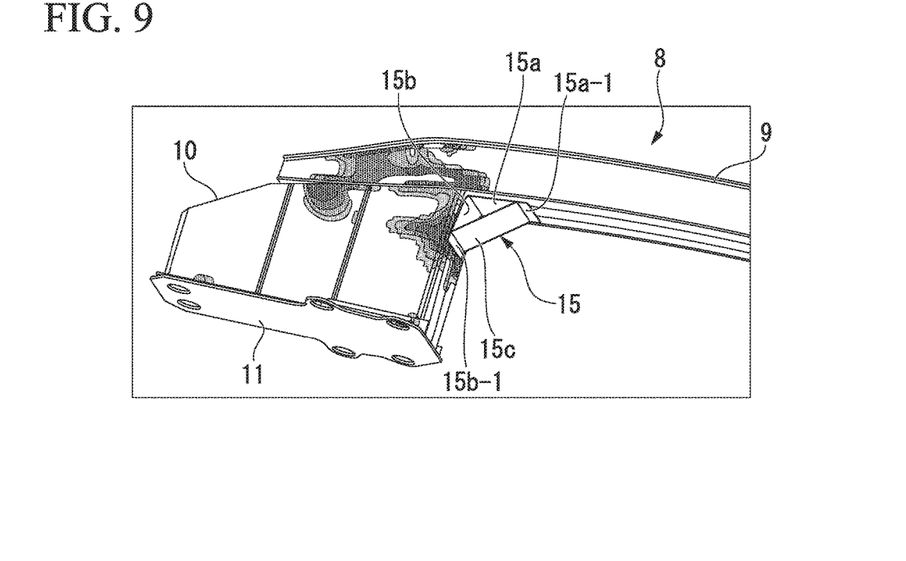
FIG. 9 is a perspective view in which images of load distribution of the bumper unit according to the embodiment of the present invention are overlapped with each other.

FIG. 9 is a view showing stress distribution of the parts of the bumper unit 8 when the load input from the forward side of the bumper beam 9 is small, using concentration of dots. In FIG. 9, as the concentration of the dots thickens, stress is increased. In the following description, this is also the same in FIGS. 10 and 11.

When the load input from the forward side of the bumper beam 9 is small, the load input into the bumper beam 9 is directly supported by the front end surface of the crush box 10 and also supported by the inner side surface of the crush box 10 via the corner reinforcement member 15. For this reason, as shown in FIG. 9, the load input into the bumper beam 9 is received by the front end surface and the inner side surface of the crush box 10, and stress in the vicinity thereof slightly increases but the increase in stress to a level that causes crush of the crush box 10 to start does not occur.

Here, since the crush boxes 10 do not crush but only the bumper beam 9 is deformed, the load can be prevented from being applied to the radiator 6 or the like serving as functional parts of the front section of the vehicle. Accordingly, the functional parts disposed at the front section of the vehicle can be easily protected.

In addition, since the crush boxes 10 at this time do not crush in the forward and rearward directions of the vehicle body but receive the load at the front end surface and the inner side surface thereof and slightly deform, energy of the input load can be efficiently absorbed by the deformation of the crush boxes 10 in a wide range.

Figure 10:
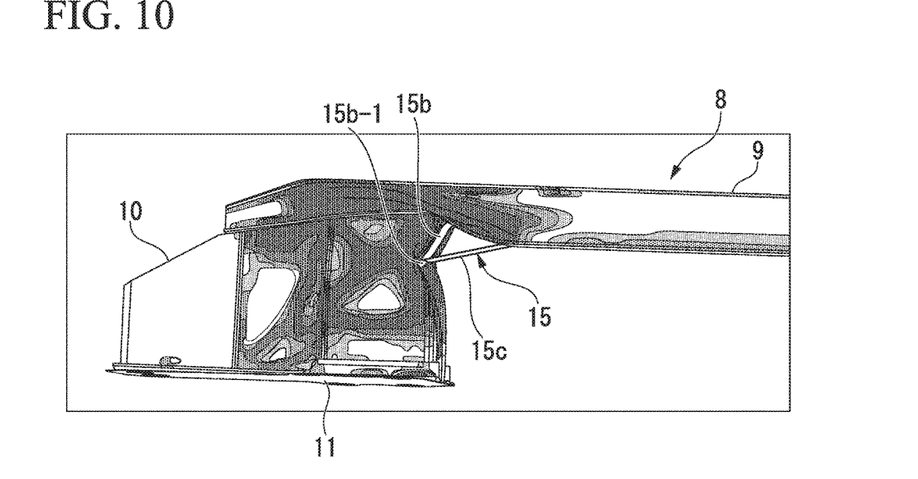
FIG. 10 is a plan view in which images of load distribution of the bumper unit according to the embodiment of the present invention are overlapped with each other.
Figure 11:
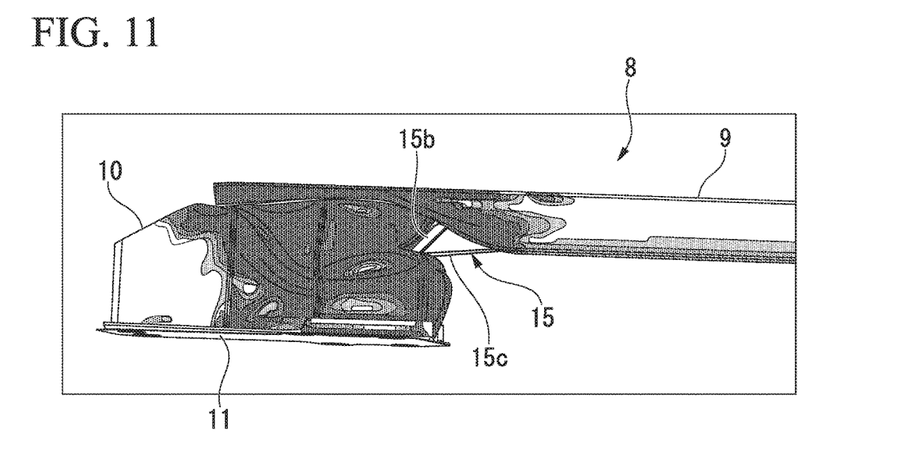
FIG. 11 is a plan view in which images of load distribution of the bumper unit according to the embodiment of the present invention are overlapped with each other.

Similarly to FIG. 9, FIG. 10 is a view showing stress distribution of parts of the bumper unit 8 when the load input from the forward side of the bumper beam 9 is large. In addition, similarly to FIG. 9, FIG. 11 is a view showing stress distribution of the parts of the bumper unit 8 when the load input from the forward side of the bumper beam 9 is increased, like in FIG. 9.

When the load input into the bumper beam 9 is large, the load is directly input into the front end surfaces of the crush boxes 10 from the bumper beam 9 while the bumper beam 9 is deformed, and as shown in FIG. 10, the load is input from the inclined wall 15c of the corner reinforcement member 15 into the inner side surfaces of the crush boxes 10 to press the inner side surfaces. In particular, when a large load is input into a central region in the width direction of the bumper beam 9, the corner reinforcement member 15 is inclined to strongly press the inner side surfaces of the crush boxes such that the inclined wall 15c bites the inner side surfaces.

Here, the crush boxes 10 can easily crush in the forward and rearward directions of the vehicle due to the pressing of the inner side surface by the corner reinforcement member 15. Accordingly, when the input of the load from the forward side of the bumper beam 9 continues, as shown in FIG. 11, crush of the crush boxes 10 starts, and the input load can be efficiently absorbed by the crush.

In addition, since the crush boxes 10 can easily start to crush due to the pressing of the inner side surface by the corner reinforcement member 15, a peak of a load resistance immediately before crush of the crush boxes 10 can be suppressed to a low level. For this reason, for example, when an airbag apparatus mounted in the vehicle performs operation determination on the basis of acceleration (deceleration) applied to the vehicle, an airbag can be prevented from deploying at an undesired timing due to a temporary increase in acceleration (deceleration). In addition, since the load does not exceed the load resistances of the front side-frames 3 and the auxiliary side-frames 5, the crush boxes 10 can be efficiently deformed.

Figure 12:
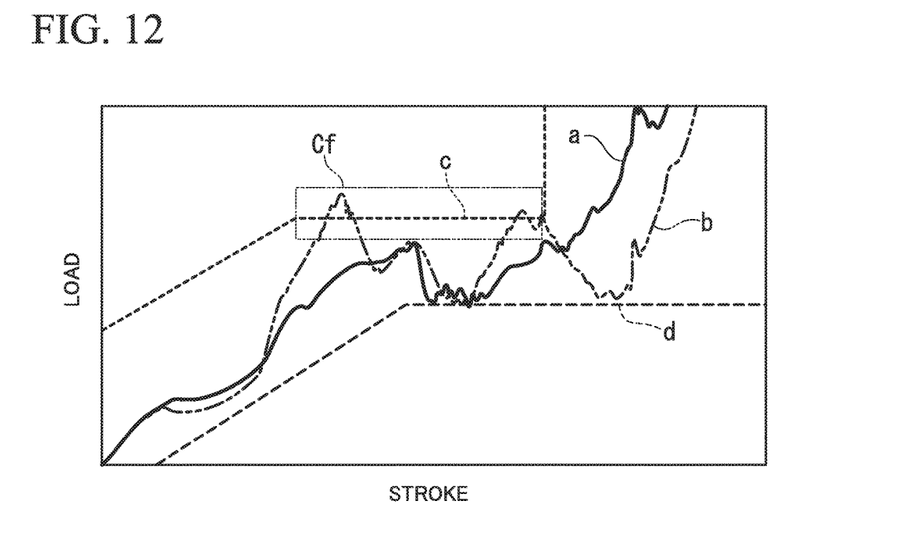
FIG. 12 is a graph showing stroke-load characteristics of the bumper unit according to the embodiment of the present invention and a bumper unit of a comparative example.

FIG. 12 is a view showing relation characteristics between deformation strokes and input loads of the vehicle according to the embodiment including the corner reinforcement member 15 and a vehicle of a comparative example that does not include the corner reinforcement member 15, when the load is input from the forward side of the vehicle. Further, in FIG. 12, a solid line shown by reference character a shows characteristic values of the vehicle according to the embodiment, and a dotted line shown by reference character b shows characteristic values of the vehicle of the comparative example. In addition, in FIG. 12, dotted lines shown by reference characters c and d show upper limit values and lower limit values of the loads that can determine whether the airbag apparatus is deployed and that can determine severity of optimal collision. Severity of the collision is classified on the basis of collision magnitudes, for example, deformation of the bumper beam 9 only, deformation of the bumper beam 9 and the crush boxes 10, deformation of the front side-frames 3 of the vehicle body frame, and so on. Cf of a horizontal portion of the dotted line shown by the reference character c in FIG. 12 shows load resistances of the front side-frames 3 and the auxiliary side-frames 5.

As shown in FIG. 12, in the vehicle according to the embodiment, since a peak of the load resistance immediately before crush of the crush boxes 10 is suppressed to a low level, a detection value of an acceleration sensor of the airbag apparatus can be prevented from exceeding an upper limit value at an undesired timing upon input of the load, and the crush boxes 10 can be deformed without leaving a crushed remainder.

In addition, when the load input from the forward side of the bumper beam 9 is larger, after the crush boxes 10 crush in the forward and rearward directions, energy of the input load can be absorbed as the front side-frames 3 and the auxiliary side-frames 5 are deformed.

As described above, in the vehicle front structure of the embodiment, the corner reinforcement members 15 are disposed at the corner portions between the rear surface of the bumper beam 9 and the side surfaces of the crush boxes 10, and the outer surfaces of the corner reinforcement members 15 are joined in a state in which the outer surfaces abut the rear surface of the bumper beam 9 and the inner side surfaces of the crush boxes 10. For this reason, when the input load is small, the bumper beam 9 is deformed in preference to absorb energy of the input load, and when the input load is large, the pressing of the inner side surface by the corner reinforcement member 15 helps the starting of the crush of the crush boxes 10, and thus energy of the input load can be efficiently absorbed.

Accordingly, when the vehicle front structure according to the embodiment is employed, in any type of load input, deformation behaviors of the parts appropriate for the types of the load input can be obtained.

In addition, in the vehicle front structure of the embodiment, the corner reinforcement member 15 is a member of which a horizontal cross section of the outer surface has a polygonal shape, and has at least the inclined wall 15c. For this reason, the corner reinforcement member 15 can be easily manufactured, and timing and behavior of the crush of the crush boxes 10 can be easily set and adjusted by varying a thickness of the inclined wall 15c.

In particular, in the case of the embodiment, the corner reinforcement member 15 is formed in a substantially triangular hollow cross-sectional shape having the first sidewall 15a, the second sidewall 15b and the inclined wall 15c, the first sidewall 15a and the second sidewall 15b are connected by the arc-shaped wall 15d, and the extension flanges 15a-1 and 15b-1 extend from the end portions of the first sidewall 15a and the second sidewall 15b opposite to the arc-shaped wall 15d. For this reason, even when protrusions or the like are formed at the corner portions between the rear surface of the bumper beam 9 and the side surfaces of the crush boxes 10, the corner reinforcement member 15 can be prevented from interfering with the protrusions or the like by an arc-shaped surface of the outside of the arc-shaped wall 15d. Accordingly, the corner reinforcement members 15 can be easily joined to the bumper beam 9 and the crush boxes 10. In addition, concentration of stress on the connecting portions to the first sidewall 15a and the second sidewall 15b can be reduced by the arc-shaped wall 15d having a substantially arc-shaped cross section.

Further, in the case of the embodiment, since the extension flanges 15a-1 and 15b-1 extend from the first sidewall 15a and the second sidewall 15b, the corner reinforcement members 15 can be easily joined to the bumper beam 9 and the crush boxes 10 using the extension flanges 15a-1 and 15b-1. A joining area of the corner reinforcement members 15 with respect to the bumper beam 9 or the crush boxes 10 can also be increased. Further, when the corner reinforcement members 15 are formed in such shape, the corner reinforcement members 15 can be easily manufactured through metal extrusion such as aluminum extrusion or the like.

In addition, in the vehicle front structure of the embodiment, since the bumper beam 9 has the plurality of hollow sections 17 partitioned by the lateral walls 16 and the crush boxes 10 have the plurality of hollow sections 19 partitioned by the longitudinal walls 18, the load input into the bumper beam 9 from the forward side can be efficiently transmitted to the front side-frames 3 and the auxiliary side-frames 5 through the bumper beam 9 and the crush boxes 10 having multi-layered structures formed therein.

In addition, in the vehicle front structure of the embodiment, the openings 20 of both end portions of the bumper beam 9 are closed by the lid members 21, and the extension sections 21b extending from the lid members 21 are coupled to the front end portions of the auxiliary side-frames 5 in the crush boxes 10 together with the crush boxes 10. For this reason, when a large offset load is input into one end side of the bumper beam 9, the bumper beam 9 is inclined in a load input direction, and forward rising of the other end side of the bumper beam 9 is restricted by the extension section 21b of the lid member 21 of the other end side. As a result, since the load can be easily input into the crush box 10 of the other end side, energy of the input load can be efficiently absorbed within a wide range in the vehicle width direction.

In particular, in the case of the embodiment, since the deformation allowable portion 21b-2 having a wave pattern shape is formed at the extension section 21b of the lid member 21, when the load is input into the bumper beam 9, it is possible to suppress the extension section 21*b* of the lid member 21 interfering with the crush of the crush boxes 10. Accordingly, when this structure is employed, it is possible to crush the crush boxes 10 within a load range as designed.

Further, in the vehicle front structure of the embodiment, the crush boxes 10 are coupled to and bridged between the front end portions of the front side-frames 3 and the front end portions of the auxiliary side-frames 5, and the reinforcement blocks 13 having substantially triangular shapes when seen from above are joined to the front end portions of the auxiliary side-frames 5, the rear surface of the bumper beam 9 and the side surfaces of the front side-frames 3, and the load transmission walls 13*a* of the reinforcement blocks 13 diagonally extend from the front end portions of the auxiliary side-frames 5 toward the vicinity of the fragile portions 12 of the front side-frames 3. For this reason, when a large offset load is input into one end side in the vehicle width direction of the bumper beam 9, the input load can be applied to the vicinity of the fragile portions 12 of the front side-frames 3 through the load transmission walls 13*a* of the reinforcement blocks 13 having substantially rectangular shapes when seen from above. Accordingly, after the crush boxes 10 crush, the front side-frames 3 can be easily folded about the fragile portions 12. Accordingly, when this structure is employed, energy of the input load can be efficiently absorbed by deformation of the front side-frames 3 and the auxiliary side-frames 5.

Here, while the horizontal cross section of the outer surface of the corner reinforcement member 15 of the embodiment has a substantially right-triangular shape, the corner reinforcement member may have another shape as long as a horizontal cross section of an outer surface is a polygonal shape and has an inclined wall extending to diagonally connect the rear surface of the bumper beam and the outer side surface of the crush box.

Figure 13:
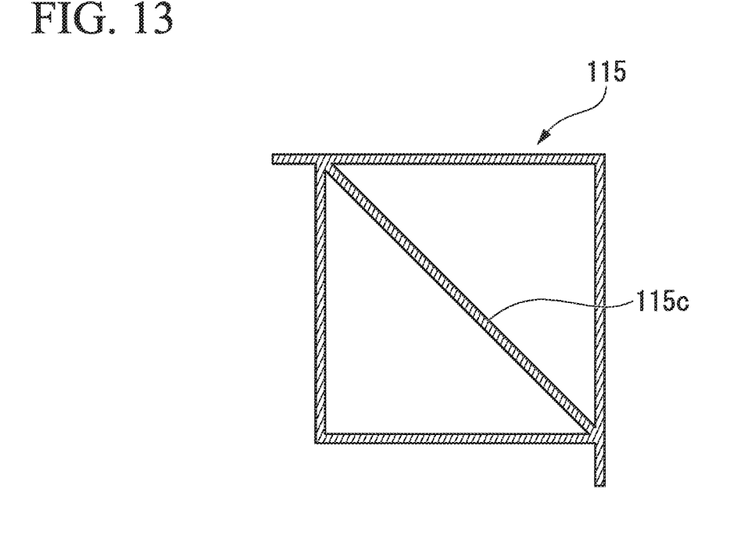
FIG. 13 is a cross-sectional view of a corner reinforcement member according to another embodiment of the present invention.
Figure 14:
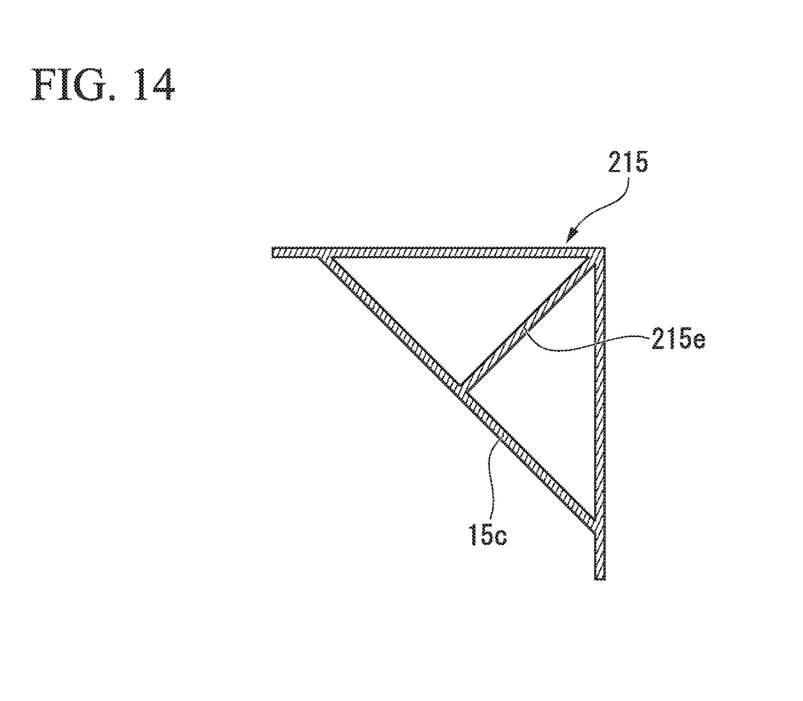
FIG. 14 is a cross-sectional view of a corner reinforcement member according to still another embodiment of the present invention.

FIGS. 13 and 14 are views showing examples of corner reinforcement members 115 and 215 having different shapes from the above-mentioned embodiment.

In the corner reinforcement member 115 shown in FIG. 13, a horizontal cross section of an outer surface is formed in a substantially quadrangular shape, and an inclined wall 115*c* is installed therein to connect diagonal corners.

In addition, in the corner reinforcement member 215 shown in FIG. 14, a horizontal cross section of an outer surface is formed in a substantially triangular shape, and a reinforcement rib 215*e* is formed to connect the inclined wall 15*c* and a diagonal corner thereof. In this case, stiffness of the corner reinforcement member 215 can be efficiently increased by the reinforcement rib 215*e*.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle front structure comprising:
    a front frame member of a vehicle;
    a bumper beam disposed at a front section of the vehicle in a vehicle width direction;
    a crush box fixed to a rear surface of the bumper beam and having a rear end portion coupled to a front end portion of the front frame member; and
    a corner reinforcement member disposed at a corner portion formed between the rear surface of the bumper beam and a side surface of the crush box,
    wherein an outer surface of the corner reinforcement member is joined in a state in which the outer surface abuts the rear surface of the bumper beam and the side surface of the crush box,
    wherein the bumper beam has an opening formed at an end portion in the vehicle width direction,
    wherein the opening is closed by a lid member,
    wherein the lid member has an extension section extending toward an inside of the crush box, and
    wherein the extension section is coupled to the front frame member together with the crush box.

2. The vehicle front structure according to claim 1,
    wherein the corner reinforcement member is a member in which a horizontal cross section of the outer surface has a polygonal shape, and has at least an inclined wall extending to diagonally connect the rear surface of the bumper beam and the side surface of the crush box.

3. The vehicle front structure according to claim 2,
    wherein the corner reinforcement member has a substantially triangular hollow cross section formed by a first sidewall joined to the rear surface of the bumper beam, a second sidewall joined to the side surface of the crush box, and the inclined wall configured to diagonally couple the first sidewall and the second sidewall,
    wherein the first sidewall and the second sidewall are connected by an arc-shaped wall having a substantially arc-shaped cross section, and
    wherein extension flanges are arranged at end portions of the first sidewall and the second sidewall that are opposite to the arc-shaped wall, the extension flanges being joined to the rear surface of the bumper beam and the side surface of the crush box.

4. The vehicle front structure according to claim 1,
    wherein the bumper beam has a plurality of hollow sections having cross sections in forward, rearward, upward and downward directions of a vehicle body, which are partitioned by lateral walls, and
    wherein the crush box has a plurality of hollow sections having cross sections in the vehicle width direction and the upward and downward directions, which are partitioned by longitudinal walls.

5. The vehicle front structure according to claim 2,
    wherein the bumper beam has a plurality of hollow sections having cross sections in forward, rearward, upward and downward directions of a vehicle body, which are partitioned by lateral walls, and
    wherein the crush box has a plurality of hollow sections having cross sections in the vehicle width direction and the upward and downward directions, which are partitioned by longitudinal walls.

6. The vehicle front structure according to claim 3,
    wherein the bumper beam has a plurality of hollow sections having cross sections in forward, rearward, upward and downward directions of a vehicle body, which are partitioned by lateral walls, and
    wherein the crush box has a plurality of hollow sections having cross sections in the vehicle width direction and the upward and downward directions, which are partitioned by longitudinal walls.

7. The vehicle front structure according to claim 1,
    wherein a deformation allowable portion having a wave pattern shape is formed at the extension section of the lid member.

8. The vehicle front structure according to claim 1,
wherein the front frame member has a front side-frame extending forward from a front section of a vehicle compartment, and an auxiliary side-frame having a front end portion disposed outside of the front side-frame in the vehicle width direction,
wherein a fragile portion is formed at a position spaced apart from the front end portion of the side surface of the front side-frame,
wherein the crush box is coupled and bridged to the front end portion of the front side-frame and the front end portion of the auxiliary side-frame,
wherein a reinforcement block having a substantially triangular shape when seen from above is joined to the front end portion of the auxiliary side-frame, the rear surface of the bumper beam and the side surface of the front side-frame, and
wherein the reinforcement block has a load transmission wall diagonally extending from the front end portion of the auxiliary side-frame toward a vicinity of the fragile portion of the front side-frame.

\* \* \* \* \*